(12) United States Patent
Jarmon

(10) Patent No.: US 9,897,398 B2
(45) Date of Patent: Feb. 20, 2018

(54) EXTREME ENVIRONMENT HEAT EXCHANGER

(71) Applicant: UNITED TECHNOLOGIES CORPORATION, Hartford, CT (US)

(72) Inventor: David C. Jarmon, Kensington, CT (US)

(73) Assignee: United Technologies Corporation, Farmington, CT (US)

( * ) Notice: Subject to any disclaimer, the term of this patent is extended or adjusted under 35 U.S.C. 154(b) by 741 days.

(21) Appl. No.: 14/248,614

(22) Filed: Apr. 9, 2014

(65) Prior Publication Data

US 2014/0332191 A1  Nov. 13, 2014

Related U.S. Application Data

(60) Provisional application No. 61/820,249, filed on May 7, 2013.

(51) Int. Cl.
| F28F 21/04 | (2006.01) |
| F28F 1/00 | (2006.01) |
| B23P 15/26 | (2006.01) |
| F28F 21/08 | (2006.01) |
| F28D 7/00 | (2006.01) |
| F28D 7/10 | (2006.01) |
| F28F 1/16 | (2006.01) |

(52) U.S. Cl.
CPC ............ *F28F 21/04* (2013.01); *B23P 15/26* (2013.01); *F28D 7/0008* (2013.01); *F28D 7/103* (2013.01); *F28F 1/003* (2013.01); *F28F 1/16* (2013.01); *F28F 21/08* (2013.01); *F28F 2265/26* (2013.01); *Y10T 29/49361* (2015.01); *Y10T 29/49377* (2015.01)

(58) Field of Classification Search
CPC .. F28F 21/04; F28F 19/02; F28F 13/18; F28F 21/08; F28F 1/16; F28F 2265/26; F28D 7/106; F28D 7/10; F28D 7/103; F28D 7/0008; C21B 13/105; C22B 1/216; B23P 15/26; Y10T 29/49361; Y10T 29/49377
See application file for complete search history.

(56) References Cited

U.S. PATENT DOCUMENTS 813,918 A * 2/1906 Schmitz .................. F28D 7/103
122/367.2
2,405,075 A  7/1946 Vollrath
(Continued)

FOREIGN PATENT DOCUMENTS

JP          05000385 A  *  1/1993

*Primary Examiner* — Tho V Duong
(74) *Attorney, Agent, or Firm* — Bachman & LaPointe, PC

(57) ABSTRACT

The heat exchanger (10) includes a ceramic matrix composite (12) (stable at temperatures up to 1,650° C.) surrounding and defining a hot fluid conduit (14). A hardenable material (18) having a high thermal conductivity is formed into a heat transfer layer (16) surrounding the ceramic matrix composite (12). A metal pipe (20) is coextensive with the heat transfer layer (16) and defines at least a portion (22) of at least one cool fluid passage (24, 34, 54) defined adjacent to and in heat exchange relationship with the heat transfer layer (16) so that a fluid passing through the cool fluid passage (24, 34, 54) absorbs heat passing through the heat transfer layer (16) from the hot fluid passing through the hot fluid conduit (14).

11 Claims, 2 Drawing Sheets

(56) References Cited

U.S. PATENT DOCUMENTS

| | | | | |
|---|---|---|---|---|
| 3,033,651 | A | * | 5/1962 | Latham, Jr. .............. C09C 1/50 |
| | | | | 422/156 |
| 4,642,864 | A | | 2/1987 | Metcalfe et al. |
| 4,862,955 | A | * | 9/1989 | Itakura .................... F28D 7/103 |
| | | | | 123/196 AB |
| 5,215,144 | A | * | 6/1993 | May .................... F28D 21/0008 |
| | | | | 165/154 |
| 5,881,775 | A | | 3/1999 | Owen et al. |
| 6,019,168 | A | * | 2/2000 | Kinnersly ............... F28D 7/106 |
| | | | | 165/154 |
| 7,951,459 | B2 | | 5/2011 | Tang et al. |
| 9,494,063 | B2 | * | 11/2016 | Dupmeier ............. F01K 23/065 |
| 2010/0186644 | A1 | * | 7/2010 | Sugitatsu ............... C21B 13/105 |
| | | | | 110/203 |
| 2011/0174412 | A1 | * | 7/2011 | Jebasinski ................ F01N 3/28 |
| | | | | 138/145 |
| 2011/0219775 | A1 | | 9/2011 | Jarmon et al. |

* cited by examiner

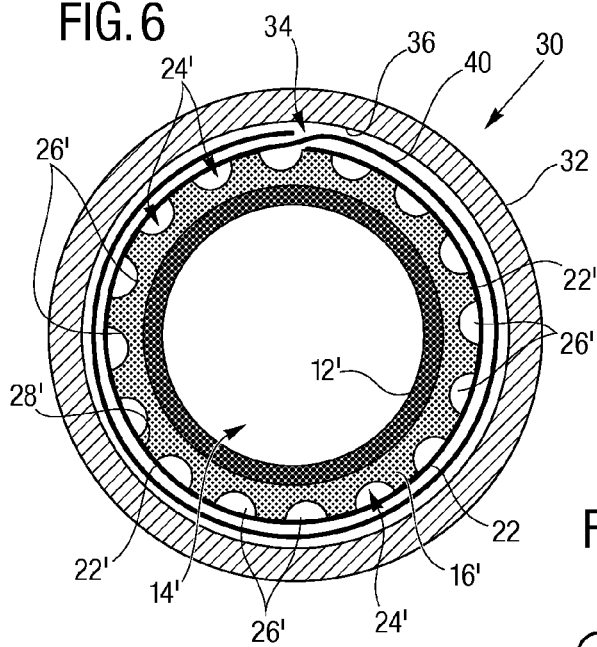
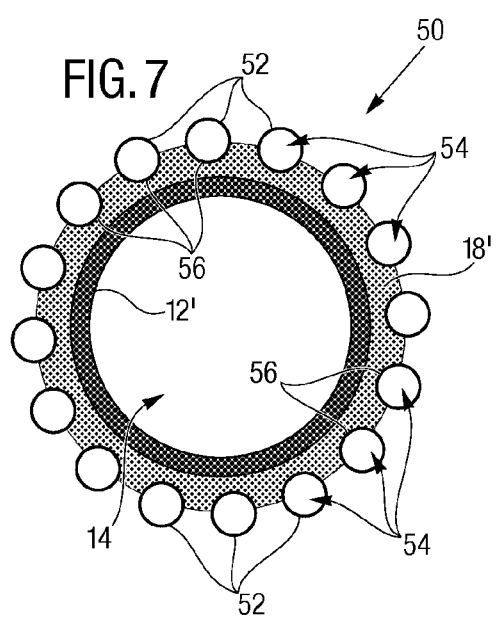
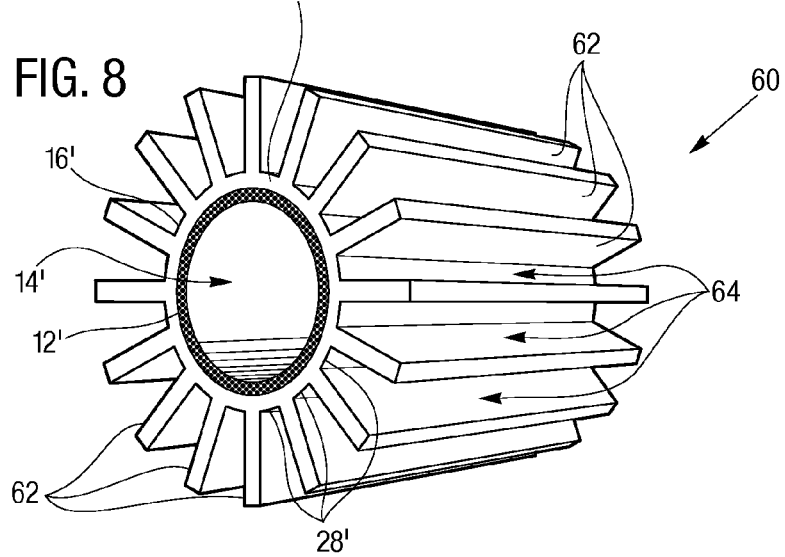

EXTREME ENVIRONMENT HEAT EXCHANGER

CROSS REFERENCE TO RELATED APPLICATION

This Application claims the benefit of U.S. Provisional Patent Application Ser. No. 61/820,249 that was filed on May 7, 2013, entitled "EXTREME ENVIRONMENT HEAT EXCHANGER".

TECHNICAL FIELD

The present disclosure relates to heat exchangers for transferring heat from a hot fluid conduit to a cool fluid passage, and in particular relates to a heat exchanger having a hot fluid conduit capable of tolerating fluids reaching temperatures up to three thousand degrees Fahrenheit (sixteen-hundred and fifty degrees Celsius) and/or corrosive fluids.

BACKGROUND ART

In the field of extremely high temperature tolerant materials it is known to use ceramic compounds combined with varying materials to transport high temperature fluids. For example, U.S. Pat. No. 2,405,075 that issued on Nov. 27, 1943 to Vollrath discloses a gas impervious ceramic tube capable of tolerating fluids reaching temperatures up to one-thousand five hundred degrees Fahrenheit (1,500° F.) (815.6° C.) for thermocouple and temperature monitoring purposes. U.S. Pat. No. 4,642,864 that issued on Feb. 17, 1987 to Metcalf et al. also discloses use of a ceramic tube with a circumferentially disposed metal sleeve that is bonded to the ceramic tube with a ceramic bonding material including 70% aluminum oxide and 25% silicon oxide. This ceramic tube having a metal sleeve is capable of tolerating high-temperature fluids passing over the metal tube while a heat absorbing fluid passes through the interior ceramic tube. The ceramic-metal tube also provides thermal expansion stability at the metal-ceramic bond. More recently, U.S. Pat. No. 5,881,775 that issued on Mar. 16, 1999 to Owen et al. discloses a heat exchanger ceramic core tube for transporting high-temperature fluids. The ceramic tube is wrapped with a circumferentially extending, reinforcing material impregnated with a slurry of ceramic particles to protect against explosive displacement of portions of the ceramic core tube in the event of a catastrophic failure of the tube.

These disclosures confront the many difficulties of integrating high-temperature tolerant ceramic materials with metal components, wherein the ceramic and metal have substantially different coefficients of thermal expansion and likewise different responses to varying mechanical, chemical and other stresses common to extreme environment heat exchangers. Heat exchangers require precise dimensions of various components. For example, for consistent rates of heat transfer, thicknesses of extremely hot fluid containing conduits and other heat transfer surfaces must be manufactured to precise tolerances. Machining of such extreme environment heat exchanger components becomes exceptionally challenging when it is necessary to extract heat from fluids reaching 3,000° F. (1,650° C.).

Therefore, there is a need for an improved extreme environment heat exchanger that overcomes the limitations of the prior art.

SUMMARY OF THE INVENTION

The disclosure is an extreme environment heat exchanger for transferring heat from a hot fluid conduit to a cool fluid passage. The heat exchanger includes a ceramic matrix composite surrounding and defining the hot fluid conduit and configured so that a hot fluid passing along the conduit cannot pass out of the conduit through the ceramic matrix composite. The ceramic matrix composite is also manufactured to have mechanical stability at temperatures up to about 3,000 degrees Fahrenheit (1,650 degrees Celsius). (For purposes herein, the word "about" is to mean plus or minus 10%.) A heat transfer layer surrounds the ceramic matrix composite, and the heat transfer layer is made of a hardenable material having a thermal conductivity of at least 20 Btu/(hr. ft$^2$° F.) (or 35 W/m. K). (For convenience, hardenable material having a thermal conductivity of at least 20 Btu/(hr. ft$^2$° F.) will be hereinafter occasionally referred to as "hardenable material having a high thermal conductivity".) The hardenable material is machined to have exterior surface finish tolerances of about 0.005 inches (0.127 millimeters ("mm")). (For purposes herein, the phrase "surface finish tolerances of about 0.005 inches" is to mean that no point on the surface projects 0.005 inches above or descends 0.005 inches below a plane tangent to the point on the surface.) A metal pipe is coextensive with the heat transfer layer. The metal pipe may be fabricated by an encircling metal sheet formed into a pipe or any other metal cylindrical enclosure. The metal pipe also defines at least a portion of at least one cool fluid passage defined adjacent to and in heat exchange relationship with the heat transfer layer so that a fluid passing through the cool fluid passage absorbs heat passing through the heat transfer layer from the hot fluid passing through the hot fluid conduit.

The hardenable material has a thermal conductivity of at least 20 Btu/(hr. ft$^2$° F.) and is selected from the group consisting of metals including silicon, silver, copper, aluminum, nickel, nickel alloys, and ceramics including boron nitride, tungsten carbide, silicon carbide the aforesaid hardenable materials reinforced with at least one of chopped fibers, hard ceramic particles, soft ceramic particles, carbides, graphite, carbon, glass, silicon carbide, silicon nitride or boron nitride, and combinations thereof.

In an embodiment of the extreme environment heat exchanger, a second portion of the at least one cool fluid passage is defined within an exterior surface of the heat transfer layer. Therefore, the cool fluid passage is defined between the heat transfer layer and the surrounding metal pipe. The cool fluid passage is also coextensive with the hot fluid conduit. In a further embodiment, a plurality of portions of a corresponding plurality of cool fluid passages is defined within the exterior surface of the heat transfer layer. The plurality of cool fluid passages is thus defined between the heat transfer layer and the surrounding metal pipe. The cool fluid passages are also coextensive with the hot fluid conduit.

In another aspect of the extreme environment heat exchanger, the surrounding, coextensive metal pipe is circumferentially displaced from the heat transfer layer so that the cool fluid passage is defined between an interior surface of the displaced metal pipe and the exterior surface of the heat transfer layer. This embodiment may also include a plurality of portions of cool fluid passages defined within the exterior surface of the heat transfer layer to increase a surface area of the heat transfer layer exposed to a cooling fluid passing through the cool fluid passage defined between the metal pipe and the heat transfer surface.

Additionally, a metal coil seal may be secured between the outer surface of the heat transfer layer and the interior surface of the metal pipe. The coil seal is not bonded to the exterior surface of the heat transfer layer. The coil seal overlaps itself and therefore enables differential thermal growth or physical expansion of the coil between the heat transfer layer and the metal pipe in directions parallel to, perpendicular to, and rotationally about an axis of fluid flow within the hot fluid conduit. This minimizes thermal expansion of the surrounding metal pipe by effectively concentrating heat within the coil and reducing a rate of heat transfer into the metal pipe. The coil seal may also serve as second portions of a plurality of portions of cool fluid passages defined within the exterior surface of the heat transfer layer. In this embodiment, most of the heat transferred from the hot fluid moves into the cool fluid flowing through the cool fluid passages, while the coil seal expands longitudinally, axially and rotationally about itself, thereby serving to protect the surrounding, circumferentially displaced metal pipe from thermal expansion. The metal coil seal may also be configured to be coextensive with the heat transfer layer.

In yet another embodiment of the disclosure, the extreme environment heat exchanger includes a plurality of metal pipes, wherein each metal pipe defines a complete cool fluid passage. Each metal pipe is also secured adjacent to and coextensive with the heat transfer layer. A further aspect of this embodiment includes the exterior surface of the heat transfer layer defining a plurality of channels configured so that each of the plurality of metal pipes is secured within each of the plurality of channels to increase a rate of heat transfer between the heat transfer layer and the cool fluid passages defined by the metal pipes. Additionally, the metal pipes may be bonded within the channels to further increase a rate of heat transfer, so that the metal pipes, heat transfer layer and the hot fluid conduit defined by the ceramic matrix composite form an integral extreme environment heat exchanger.

An additional aspect of the disclosure includes a hot fluid conduit defined by a ceramic matrix composite and surrounded by a coextensive layer of hardenable material having a high thermal conductivity forming a heat transfer layer, wherein the heat transfer layer also defines a plurality of heat discharge extensions extending from the exterior surface of the heat transfer layer and away from the hot fluid conduit. The heat discharge extensions may take the form of one of fins and pins. Such fin-shaped discharge extensions may be continuous or discontinuous and may extend in a direction away from the heat transfer layer and generally parallel to a longitudinal axis of flow of the hot fluid through the ceramic matrix composite tube. Additionally, the heat discharge extensions may extend along a non-linear, tortuous path so that the heat discharge extensions make the cooling fluid follow a greater distance per unit of hot fluid flow to increase an amount of heat transfer to the cooling fluid and thereby increase an efficiency of the heat exchanger. In other words, the more effective the discharge extensions are in disrupting laminar cooling fluid flow and creating turbulent cooling fluid flow, the greater the potential heat transfer to the cooling fluid and the more efficient the heat exchanger.

The disclosure also includes manufacture of the heat transfer layer so that the layer is between about one-half and about ten times a wall thickness of the ceramic matrix composite tube. In an exemplary embodiment, the thickness of the wall of the ceramic matrix composite tube ranges from between about 0.05 inches and about 0.25 inches (about 1.27 mm to about 6.35 mm).

This disclosure also includes a method of manufacturing the extreme environment heat exchanger. The method includes fabricating the hot fluid conduit by forming a ceramic matrix composite into an elongate form that defines the hot fluid conduit within the ceramic matrix composite. Next, a heat transfer layer made of the hardenable material is bonded to the ceramic matrix composite so that the heat transfer layer surrounds and is coextensive with the hot fluid conduit defined by the ceramic matrix composite. Then, the heat transfer layer is machined so that the heat transfer layer has about a uniform thickness surrounding the ceramic matrix composite, wherein the thickness of the heat transfer layer is between about one-half to ten times the wall thickness of the ceramic matrix composite tube. The wall thickness of the ceramic matrix composite tube will range in an exemplary embodiment from 0.05" to 0.25" (1.27 mm to 6.35 mm). The method may also include machining into the exterior surface of the heat transfer layer a plurality of channels having longitudinal axes parallel to a direction of flow of the hot fluid through the hot fluid conduit, so that heat discharge extensions are defined within the heat transfer layer. The machining of the heat transfer layer inlay be to define a plurality of channels instead of heat discharge extensions. Then the heat transfer surface and attached ceramic matrix composite may be secured within the metal pipe so that the metal pipe covers the plurality of channels in the exterior surface of the heat transfer layer to form a plurality of cool fluid passages. The method may also include inserting the coil seal between the exterior surface of the heat transfer layer and an interior surface of the metal pipe so that the coil seal covers the channels in the heat transfer layer, and the coil expands longitudinally, axially and rotationally about itself to absorb heat and minimize thermal expansion stress on the metal pipe.

Accordingly, it is a general purpose of the present disclosure to provide an extreme environment heat exchanger that overcomes deficiencies of the prior art.

It is a more specific purpose of the present disclosure to provide an extreme environment heat exchanger that removes heat from a hot fluid having a temperature up to about 3,000 degrees Fahrenheit (1,650 degrees Celsius) and that is durable and capable of being manufactured in a variety of forms for various working environments. These and other purposes and values of the present disclosure will become apparent in the following detailed description and the accompanying drawings.

BRIEF DESCRIPTION OF THE DRAWINGS

FIG. 6 is a simplified, schematic front plan view of an extreme environment heat exchanger showing a metal pipe circumferentially displaced from the outer surface of the heat transfer layer and showing an overlapping coil seal secured between the metal pipe and the heat transfer layer.

FIG. 7 is a simplified, schematic front plan view of an alternative embodiment of the extreme environment heat exchanger showing a plurality of metal pipes secured within a corresponding plurality of channels machined in an outer surface of a heat transfer layer.

FIG. 8 is a simplified, schematic front plan view of another embodiment of the extreme environment heat exchanger showing a plurality heat discharge extensions defined by the heat transfer layer and extending away from the heat transfer layer and away from the hot fluid conduit.

DESCRIPTION OF THE PREFERRED EMBODIMENTS

Figure 1:
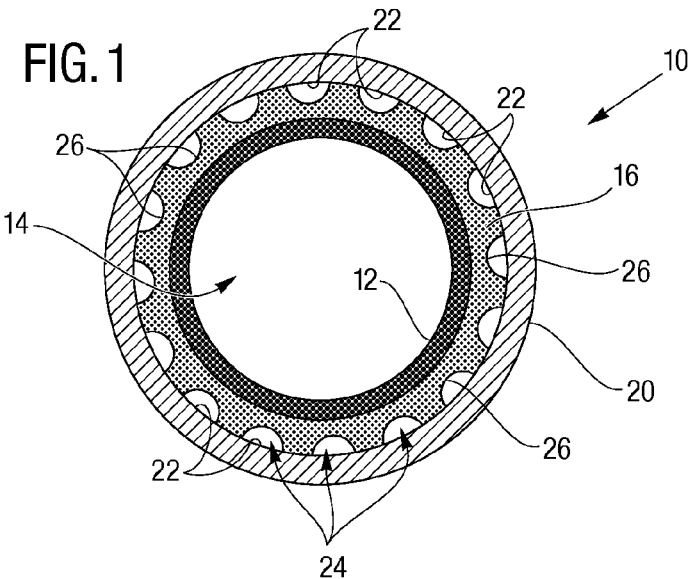
FIG. 1 is a simplified schematic front plan drawing showing an extreme environment heat exchanger constructed in accordance with the present invention.
Figure 2:
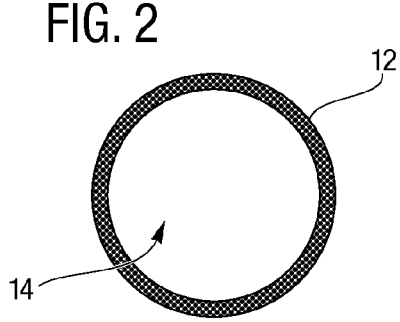
FIG. 2 is a simplified schematic front plan drawing showing a ceramic matrix composite formed into an elongate form defining a hot fluid conduit within the ceramic matrix composite.
Figure 3:
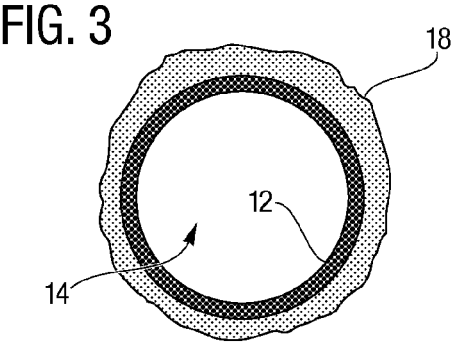
FIG. 3 is a front plan view of the FIG. 2 formed ceramic matrix composite with a hardenable material bonded to surround the ceramic matrix composite.
Figure 4:
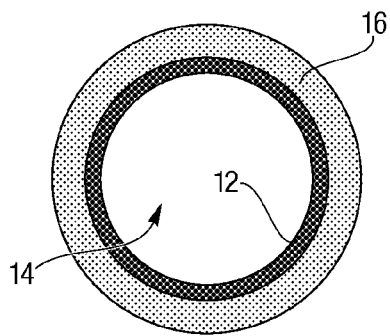
FIG. 4 is a front plan view of the FIG. 3 formed ceramic matrix composite with the hardenable material machined to a uniform thickness about the ceramic matrix composite to form a heat transfer layer.

Referring to the drawings in detail, an extreme environment heat exchanger for transferring heat from a hot fluid conduit to a cool fluid passage is shown in FIG. 1 and is generally designated by the reference numeral 10. The heat exchanger 10 includes a ceramic matrix composite 12 surrounding and defining a hot fluid conduit 14 and configured so that a hot fluid (not shown) passing along the conduit 14 cannot pass out of the conduit 14 through the ceramic matrix composite 12. The ceramic matrix composite 12 may also be manufactured to have mechanical stability at temperatures up to about 3,000 degrees Fahrenheit (1,650 degrees Celsius). (As described above, for purposes herein, the word "about" is to mean plus or minus 10%.)

A heat transfer layer 16 surrounds the ceramic matrix composite 12, and the heat transfer layer is made of a harden material 18 selected from the group consisting of metals including silicon, silver, copper, aluminum, nickel, nickel alloys, and ceramics including boron nitride, tungsten carbide, silicon carbide, the aforesaid hardenable materials reinforced with at least one of chopped fibers, hard ceramic particles, soft ceramic particles, carbides, graphite, carbon, glass, silicon carbide, con nitride or boron nitride, and combinations thereof. The hardenable material may also have a thermal conductivity of at least 20 Btu/(hr. ft$^{2\circ}$ F.). The hardenable material 18 may be applied to the ceramic matrix composite 12 by a variety of methods. An exemplary method is disclosed in U.S. Published Patent Application No. US 2011/0215775 that was published on Sep. 15, 2011, and is owned by the owner of all rights in the present disclosure. The exemplary method is air plasma spray ("APS") of the hardenable material 18 onto the ceramic matrix composite 12. The APS applied hardenable material 18 is then machined, such as by diamond grinding, so that the hardenable material 18 forms the heat transfer layer 16 surrounding the ceramic matrix composite 12. An exterior surface 28 of the heat transfer layer 16 may be machined to surface finish tolerances of about 0.005" (0.127 mm). The ceramic matrix composite 12 defining the hot fluid conduit 14 may have a uniform thickness.

As shown best in FIG. 1, a metal pipe 20 is coextensive with the heat transfer layer 16. (For purposes herein, the phrase "coextensive with" is to mean that the components that are coextensive with each other have a common point of beginning and ending and have longitudinal axes between the point of beginning and ending that are generally parallel to each other. In other words a metal pipe and a ceramic conduit are coextensive with each other if one surrounds the other as in FIG. 1, and if one is positioned alongside the other as in FIG. 7.) As shown in FIG. 1, the metal pipe 20 also defines portions 22 of cool fluid passages 24 defined adjacent to and in heat exchange relationship with the heat transfer layer 16 so that a fluid (not shown) passing through the cool fluid passages 24 absorbs heat passing through the heat transfer layer 16 from the hot fluid passing through the hot fluid conduit 14.

Figure 5:
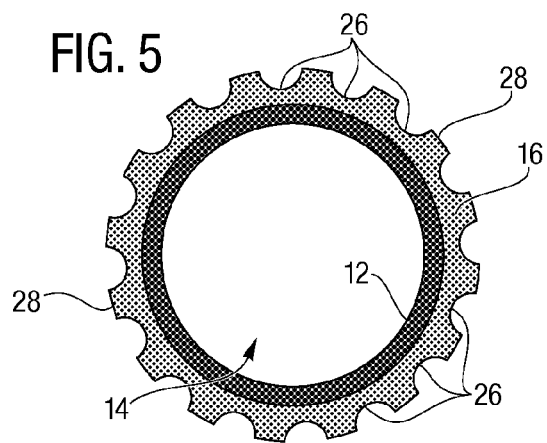
FIG. 5 is a front plan view of the FIG. 4 formed ceramic matrix composite with the heat transfer layer and showing a plurality of portions of cool fluid passages machined into an exterior surface of the heat transfer layer.

FIGS. 1 and 5 show that a second portion 26 of the cool fluid passages 24 may be defined within an exterior surface 28 of the heat transfer layer 16 so that the cool fluid passages 24 are defined between the heat transfer layer 16 and the surrounding metal pipe 20. The one or more cool fluid passages 24 are also coextensive with the hot fluid conduit 14. The one or more cool fluid passages 24 are therefore defined between the heat transfer layer 16 and the surrounding metal pipe 20.

FIG. 6 shows a displaced metal pipe embodiment 30 of the extreme environment heat exchanger 10. In this embodiment 30, a surrounding, coextensive metal pipe 32 is circumferentially displaced from the heat transfer layer 16' so that a surrounding cool fluid passage 34 is defined between an interior surface 36 of the displaced metal pipe 32 and the exterior surface 28' of the heat transfer layer 16'. (For purposes of FIG. 6 and the description of the displaced metal pipe embodiment 30, components that are virtually identical to the components described above of the FIGS. 1-5 embodiment are shown in FIG. 6 as primes of the reference numerals used in FIGS. 1-5.)

The displaced metal pipe embodiment 30 may also include a plurality of portions 26' of cool fluid passages 24' defined within the exterior surface 28' of the heat transfer layer 16'. This increases the exterior surface area 28' of the heat transfer layer 16' exposed to a cooling fluid passing through the surrounding cool fluid passage 34 and/or the cool fluid passages 24' that are defined between the metal pipe 32 and exterior surface 28' of the heat transfer layer 16'.

The displaced metal pipe embodiment 30 may also include a metal coil seal 40 secured between the exterior surface 28' of the heat transfer layer 16' and the interior surface 36 of the metal pipe 32. The coil seal 40 may not be bonded or otherwise permanently secured to the exterior surface 28' of the heat transfer layer 16'. The coil seal 40 (as shown in FIG. 6) overlaps itself and therefore enables differential thermal growth or physical expansion of the coil seal 40 between the heat transfer layer 16' and the metal pipe 32 in directions parallel to, perpendicular to, and rotationally about an axis of fluid flow within the hot fluid conduit 14'. This minimizes thermal expansion of the surrounding metal pipe 32 by effectively concentrating heat within the coil 40 and by also reducing a rate of heat transfer into the metal pipe 32. The metal coil seal 40 may be fabricated of high-temperature metals, such as a nickel alloy.

The coil seal 40 may also provide portions 22' of a plurality of cool fluid passages 24' having other portions 26' of the cool fluid passages 24' defined within the exterior surface 28' of the heat transfer layer 16'. In this embodiment, most of the heat transferred from the hot fluid moves into the cool fluid flowing through the cool fluid passages 24', while the coil seal 40 expands longitudinally, axially and rotationally about itself. This serves to protect the surrounding, circumferentially displaced metal pipe 32 from damaging thermal expansion. The metal coil seal 40 may also be configured to be coextensive with the heat transfer layer 16'.

FIG. 7 shows a multi-tube embodiment 50 of the extreme environment heat exchanger 10. This embodiment 50 includes a plurality of metal pipes 52, wherein each metal pipe 52 defines a complete cool fluid passage 54. Each metal pipe 52 is also secured adjacent to and coextensive with the heat transfer layer 16'. A further aspect of this embodiment includes the exterior surface 28' of the heat transfer layer 16' defining a plurality of channels 56 configured so that each of the plurality of metal pipes 54 is secured within each of the plurality of channels 56 to increase a rate of heat movement between the heat transfer layer 16' and the cool fluid passages 54 defined by the metal pipes 52. Additionally, the metal pipes 52 may be bonded within the channels 56 to further increase a rate of heat movement or transfer, so that the metal pipes 52, heat transfer layer 16' and the hot fluid conduit 14' defined by the ceramic matrix composite 12' form an integral, multi-tube extreme environment heat exchanger 50.

FIG. 8 shows a heat-discharge extension embodiment 60 of the extreme environment heat exchanger 10. This embodiment 60 includes a hot fluid conduit 14' defined by a ceramic matrix composite 12' and surrounded by a coextensive, heat transfer layer 16' of hardenable material 18'. The heat transfer layer 16' also defines a plurality of heat discharge extensions 62 extending from the exterior surface 28' of the heat transfer layer 16' and away from the hot fluid conduit 14'. A plurality of cool fluid passages 64 are defined between the heat discharge extensions 62. The heat discharge extensions 62 may take the form of fins and pins defined by the hardenable material 18 with the above described high thermal conductivity, such as metals including silicon, silver, copper, aluminum, nickel, nickel alloys. A length of extension of the heat discharge extensions away from and perpendicular to the hot fluid conduit 14' may be between about one-half and about ten times a wall thickness of the ceramic matrix composite tube 12. (For purposes herein, the phrase "a wall thickness of the ceramic matrix composite tube 12" is to mean a shortest distance between and interior and an exterior wall of the tube 12.) The wall thickness of the ceramic matrix composite tube 12, in an exemplary embodiment may range from between about 0.05 inches to 0.25 inches (1.27 mm to 6.35 mm). The heat discharge extensions 62 may take the form of fins (as shown in FIG. 8) or pins (not shown). Fin-shaped discharge extensions 62 may be continuous (as shown in FIG. 8) or may be discontinuous (not shown), and the extensions 62 may extend in a direction away from the heat transfer layer 16' and generally parallel to a longitudinal axis of flow of the hot fluid through the ceramic matrix composite tube 12' hot fluid conduit 14'. As described above, the heat discharge extensions 62 may also extend along a non-linear, tortuous path (not shown) so that the heat discharge extensions 62 make cooling fluid follow a greater distance per unit of hot fluid flow through the hot fluid conduit 14' to increase an amount of heat transfer to the cooling fluid passing adjacent the heat discharge extensions 62 to thereby increase an efficiency of the heat discharge extension heat exchanger 60.

The disclosure also includes manufacture of the heat transfer layer 16 so that the exterior surface of the heat transfer layer 28 is formed so that the layer is between about one and about ten times a wall thickness of the ceramic matrix composite tube 12. In an exemplary embodiment, the thickness of the wall of the ceramic matrix composite tube 12 ranges from between about 0.05 inches and about 0.25 inches (about 1.27 mm to about 6.35 mm).

This disclosure also includes a method of manufacturing the extreme environment heat exchanger 10. The method includes fabricating the hot fluid conduit 14 by forming a ceramic matrix composite 12 into an elongate form of about a uniform thickness 12 that defines the hot fluid conduit 14 within the ceramic matrix composite 12. Next, the hardenable material 18 is bonded to the ceramic matrix composite 12 so that the hardenable material 18 surrounds and is coextensive with the hot fluid conduit 14 defined by the ceramic matrix composite 12. Then, the hardenable material 18 is machined to produce the heat transfer layer 16 having about a uniform thickness surrounding the ceramic matrix composite 12, so that the thickness is between about one-half and about ten times a wall thickness of the ceramic matrix composite tube. The method may also include machining into the exterior surface 28 of the heat transfer layer 16 a plurality of channels 56 (FIG. 7) or a plurality of second portions 26 (FIG. 1) of cool fluid passages 24 having longitudinal axes parallel to a direction of flow of the hot fluid through the hot fluid conduit 14 and then securing a metal pipe 52 within each of the plurality of channels 56. The method may also include forming the heat transfer layer 16 to define a plurality of heat discharge extensions 62 instead of the plurality of channels 56.

The method may also include securing the heat transfer layer 16 and attached ceramic matrix composite 12 within the metal pipe 20 so that the metal pipe 20 covers the plurality of channels 56 in the exterior surface 28 of the heat transfer layer 16 to form a plurality of cool fluid passages 24. The method may also include securing the heat transfer layer 16 and attached ceramic matrix composite 12 within a circumferentially displaced metal pipe 32, securing the coil seal 40 between the exterior surface 28' of the heat transfer layer 16' and an interior surface 36 of the displaced metal pipe 32 so that the coil seal 40 covers the plurality of second portions 26' (FIG. 1) of cool fluid passages 24' in the heat transfer layer 16', and the coil 40 expanding longitudinally, axially and rotationally about itself to absorb heat and minimize thermal expansion stress on the displaced metal pipe 32.

It is pointed out that silicon carbide based ceramic matrix composites are superior to metals in corrosion resistance for chemicals such as hydrofluoric acid, bromine, and nitric acid. The ceramic matrix composite may also be manufactured to exterior surface finish tolerances of about 0.005 inches (0.127 millimeters ("mm")).

While the above disclosure has been presented with respect to the described and illustrated embodiments of an extreme environment heat exchanger 10, 30, 50, and 60 it is to be understood that other embodiments are within the scope of this disclosure. While the described and illustrated embodiments show cylindrical fluid conduits, pipe and tubes, it is to be understood that the conduits, pipes and tubes may take non-cylindrical forms, such as box-like or variable shape forms, etc. Accordingly, reference should be made primarily to the following claims rather than the foregoing description to determine the scope of the disclosure.

What is claimed is:
1. An extreme environment heat exchanger for transferring heat from a hot fluid conduit to a cool fluid passage; the extreme environment heat exchanger comprising:
   a. a ceramic matrix composite surrounding and defining the hot fluid conduit and configured so that a hot fluid passing along the conduit cannot pass out of the conduit through the ceramic matrix composite, the ceramic matrix composite also being configured to have mechanical stability at temperatures up to about 1,650 degrees Celsius;

b. a heat transfer layer surrounding and secured to the ceramic matrix composite, the heat transfer layer being made of a hardenable material; and, c. a metal pipe coextensive with the heat transfer layer, the metal pipe also defining at least a portion of at least one cool fluid passage defined adjacent to and in heat exchange relationship with the heat transfer layer so that a fluid passing through the cool fluid passage absorbs heat passing through the heat transfer layer from the hot fluid passing through the hot fluid conduit, and further comprising the surrounding, coextensive metal pipe being circumferentially displaced from the heat transfer layer so that the cool fluid passage is a surrounding cool fluid passage defined between an interior surface of the displaced metal pipe and the exterior surface of the heat transfer layer, and a metal coil seal secured between the outer surface of the heat transfer layer and the interior surface of the circumferentially displaced metal pipe, wherein the coil seal overlaps itself thereby enabling differential thermal growth of the coil between the heat transfer layer and the metal pipe.

2. The extreme environment heat exchanger of claim 1, wherein the hardenable material has thermal conductivity of at least 20 Btu/(hr. ft$^2$° F.).

3. The extreme environment heat exchanger of claim 1, wherein the hardenable material is selected from the group consisting of metals including silicon, silver, copper, aluminum, nickel, and nickel alloys, and ceramics including boron nitride, tungsten carbide, and silicon carbide, and wherein the hardenable material is reinforced with at least one of chopped fibers, hard ceramic particles, soft ceramic particles, carbides, graphite, carbon, glass, silicone carbide, silicon nitride or boron nitride, and combinations thereof.

4. The extreme environment heat exchanger of claim 1, wherein an exterior surface of the heat transfer layer defines a second portion of the at least one cool fluid passage so that the cool fluid passage is defined between the heat transfer layer and the surrounding metal pipe, and wherein the cool fluid passage is coextensive with the hot fluid conduit.

5. The extreme environment heat exchanger of claim 4, further comprising a plurality of second portions of cool fluid passages defined within the exterior surface of the heat transfer layer so that a plurality of cool fluid passages are defined between the heat transfer layer and the surrounding metal pipe, and wherein the plurality of cool fluid passages are coextensive with the hot fluid conduit.

6. An extreme environment heat exchanger for transferring heat from a hot fluid conduit to a cool fluid passage; the extreme environment heat exchanger comprising:

a. a ceramic matrix composite surrounding and defining the hot fluid conduit and configured so that a hot fluid passing along the conduit cannot pass out of the conduit through the ceramic matrix composite, the ceramic matrix composite also being configured to have mechanical stability at temperatures up to about 1,650 degrees Celsius;

b. a heat transfer layer surrounding and secured to the ceramic matrix composite, the heat transfer layer being made of a hardenable material; and c. a metal pipe coextensive with the heat transfer layer, the metal pipe also defining at least a portion of at least one cool fluid passage defined adjacent to and in heat exchange relationship with the heat transfer layer so that a fluid passing through the cool fluid passage absorbs heat passing through the heat transfer layer from the hot fluid passing through the hot fluid conduit, and further comprising the surrounding, coextensive metal pipe being circumferentially displaced from the heat transfer layer so that the cool fluid passage is a surrounding cool fluid passage defined between an interior surface of the displaced metal pipe and the exterior surface of the heat transfer layer, further comprising a plurality of portions of cool fluid passages defined within the exterior surface of the heat transfer layer, thereby increasing a surface area of the heat transfer layer exposed to a cooling fluid passing through the surrounding cool fluid, passage defined between the metal pipe and the heat transfer surface, and further comprising a metal coil seal secured between the outer surface of the heat transfer layer and the interior surface of the circumferentially displaced metal pipe, wherein the coil seal overlaps itself, and wherein the coil seal overlies the plurality of portions of cool fluid passages defined within the exterior surface of the heat transfer layer to form a plurality of cool fluid passages between the coil and the portions of cool fluid passages defined within the exterior surface of the heat transfer layer.

7. The extreme environment heat exchanger of claim 1, further comprising a plurality of metal pipes, wherein each metal pipe defines a complete cool fluid passage within the pipe, and each metal pipe being also secured adjacent to and coextensive with the heat transfer layer.

8. The extreme environment heat exchanger of claim 7, wherein the exterior surface of the beat transfer layer defines a plurality of channels configured so that one of the plurality of metal pipes is secured within each of the plurality of channels to increase a rate of heat transfer between the heat transfer layer and the cool fluid passages defined by the metal pipes.

9. The extreme environment heat exchanger of claim 1, wherein exterior surface of the heat transfer layer is machined to surface finish tolerances of about 0.005" (0.127 mm).

10. The extreme environment heat exchanger of claim 1, wherein the heat transfer layer has a thickness that is between about one-half and about ten times a wall thickness of the ceramic matrix composite tube surrounded by the heat transfer layer.

11. The extreme environment heat exchanger of claim 1, wherein the heat transfer layer has a thickness that is between about 1.27 millimeters and about 6.35 millimeters.

* * * * *